United States Patent
Noguchi

(10) Patent No.: US 9,500,529 B2
(45) Date of Patent: Nov. 22, 2016

(54) THERMAL-TYPE INFRARED SENSOR AND IMAGE FORMING APPARATUS

(71) Applicant: Hidetaka Noguchi, Hyogo (JP)

(72) Inventor: Hidetaka Noguchi, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 99 days.

(21) Appl. No.: 14/483,303

(22) Filed: Sep. 11, 2014

(65) Prior Publication Data

US 2015/0076351 A1    Mar. 19, 2015

(30) Foreign Application Priority Data

Sep. 13, 2013    (JP) .................................. 2013-190608

(51) Int. Cl.
| | |
|---|---|
| *G01J 5/14* | (2006.01) |
| *G01J 5/02* | (2006.01) |
| *G01J 5/12* | (2006.01) |
| G01J 5/00 | (2006.01) |

(52) U.S. Cl.
CPC ................ *G01J 5/14* (2013.01); *G01J 5/0225* (2013.01); *G01J 5/0285* (2013.01); *G01J 5/12* (2013.01); *G01J 2005/0077* (2013.01); *G01J 2005/123* (2013.01)

(58) Field of Classification Search
CPC ............ G01J 5/12; G01J 5/14; G01J 5/0225; G01J 5/0285; G01J 2005/0077; G01J 2005/123
See application file for complete search history.

(56) References Cited

U.S. PATENT DOCUMENTS

| | | | |
|---|---|---|---|
| 5,449,910 A | * | 9/1995 | Wood ..................... H01L 27/16 250/332 |
| 2002/0069910 A1 | | 6/2002 | Morita et al. |
| 2008/0175612 A1 | | 7/2008 | Oikawa et al. |
| 2008/0232880 A1 | | 9/2008 | Noguchi et al. |
| 2008/0303202 A1 | | 12/2008 | Noguchi et al. |
| 2009/0026689 A1 | | 1/2009 | Noguchi et al. |
| 2009/0060613 A1 | | 3/2009 | Matsuda |
| 2009/0116860 A1 | | 5/2009 | Hoshino et al. |
| 2009/0162118 A1 | | 6/2009 | Noguchi et al. |
| 2009/0207461 A1 | | 8/2009 | Hodoshima et al. |
| 2009/0212488 A1 | | 8/2009 | Hashimoto et al. |

(Continued)

FOREIGN PATENT DOCUMENTS

| | | |
|---|---|---|
| EP | 1213570 A2 | 6/2002 |
| EP | 2490073 A1 | 8/2012 |

(Continued)

OTHER PUBLICATIONS

English translation of JP 2009-180682 A.*

(Continued)

*Primary Examiner* — Marcus Taningco
*Assistant Examiner* — Mindy Vu
(74) *Attorney, Agent, or Firm* — Cooper & Dunham LLP

(57) ABSTRACT

A thermal-type infrared sensor includes a thermopile; an electrical conduction path of the thermopile, the conduction path including at least one crossed section in which the conduction path is crossed; a first region that is closed or substantially closed and formed by part of the conduction path, the part of the conduction path including an output section of the conduction path and the at least one crossed section; and a second region that is closed or substantially closed and formed by another part of the conduction path having the at least one crossed section as a boundary. The first region and the second region do not overlap each other.

21 Claims, 10 Drawing Sheets

(56) References Cited

U.S. PATENT DOCUMENTS

| | | |
|---|---|---|
| 2009/0212491 A1 | 8/2009 | Noguchi et al. |
| 2009/0220277 A1 | 9/2009 | Andoh et al. |
| 2010/0046991 A1 | 2/2010 | Hodoshima et al. |
| 2010/0054781 A1 | 3/2010 | Noguchi et al. |
| 2011/0155913 A1 | 6/2011 | Noguchi et al. |
| 2011/0316111 A1* | 12/2011 | Noda .................... G01J 5/02 257/467 |
| 2012/0061569 A1 | 3/2012 | Noguchi |
| 2012/0181430 A1 | 7/2012 | Noguchi et al. |
| 2012/0212725 A1 | 8/2012 | Lafarre et al. |
| 2014/0036953 A1* | 2/2014 | Kimura .................... G01J 5/16 374/121 |

FOREIGN PATENT DOCUMENTS

| | | |
|---|---|---|
| JP | 9-133578 | 5/1997 |
| JP | 2000-065638 A | 3/2000 |
| JP | 2009-180682 | 8/2009 |

OTHER PUBLICATIONS

Mar. 6, 2015 European Search Report in corresponding European Patent Application No. 14184500.8.

U.S. Appl. No. 14/153,588, filed Jan. 13, 2014.

U.S. Appl. No. 14/206,087, filed Mar. 12, 2014.

* cited by examiner ced, whereby a beam portion 110 is formed. The first
THERMAL-TYPE INFRARED SENSOR AND IMAGE FORMING APPARATUS

CROSS-REFERENCE TO RELATED APPLICATION

The present application claims priority to and incorporates by reference the entire contents of Japanese Patent Application No. 2013-190608 filed in Japan on Sep. 13, 2013.

BACKGROUND OF THE INVENTION

1. Field of the Invention

The present invention relates to a thermal-type infrared sensor including a thermopile, and an image forming apparatus including the thermal-type infrared sensor.

2. Description of the Related Art

Recently, development of a non-cooling thermal-type infrared array sensor, a thermal-type infrared line sensor, and the like using a bolometer, a thermopile, a diode, or the like has been performed actively. Since having sensitivity in a wavelength band from mid-infrared to far-infrared, these sensors are widely used, for example, in a night-vision camera for an automobile, a human body detection sensor for a security instrument, and a human body detection sensor for power-saving of an electric/electronic instrument.

Such a thermal-type infrared sensor mainly includes three components which are an infrared absorption layer, a heat insulation structure, and a temperature sensor. Generally, the infrared absorption layer and the temperature sensor are arranged on the heat insulation structure.

The heat insulation structure is generally a bridge structure, a diaphragm structure, or the like formed by a micro electro mechanical systems (MEMS) process or the like. By the heat insulation structure, sensitivity enough for weak infrared can be acquired.

Also, such a thermal-type infrared sensor and a lens are combined and used to adjust a field angle or a detection range and are applied to various applications.

Recently, in a detection method of the thermal-type infrared sensor, development of what uses a thermopile as a temperature sensor has been particularly performed. A thermopile thermal-type infrared sensor is disclosed, for example, in Japanese Laid-open Patent Publication No. 2000-65638. In Japanese Laid-open Patent Publication No. 2000-65638, to reduce bending and torsional stress on a beam, a thermopile thermal-type infrared sensor, in which an n-type polysilicon material and a p-type polysilicon material on the beam are arranged in a linearly symmetrical manner to a center line in a longitudinal direction of the beam, is disclosed.

FIG. 17 and FIG. 18 are general views for describing a conventional thermal-type infrared sensor. FIG. 17 is a plane view. FIG. 18 is an X-X' sectional view of FIG. 17.

On a substrate portion 101, a first thermopile material 103 and a second thermopile material 104 which configure a thermopile 102 are connected by a wiring material 105 including a conductive material, whereby a thermocouple is formed. The thermocouples are connected in series in a plurality of stages by the wiring material 105, whereby the thermopile 102 is formed. The first thermopile material 103 and the second thermopile material 104 are connected by the wiring material 105 through a contact hole 106.

A hollow portion 107 formed on the substrate portion 101 forms a thin film portion 108. In a thin film section around the thin film portion 108, a plurality of through-holes 109 is formed, whereby a beam portion 110 is formed. The first thermopile material 103 and the second thermopile material 104 are arranged over the thin film portion 108 and the substrate portion 101 across the beam portion 110.

The first thermopile material 103 and the second thermopile material 104 are formed on an insulation film 111 formed on the substrate portion 101. The first thermopile material 103, the second thermopile material 104, and the wiring material 105 are covered by an interlayer insulation film 112. On the interlayer insulation film 112, an infrared absorption film 113 is formed.

In the thermopile thermal-type infrared sensor illustrated in FIG. 17 and FIG. 18, an electric conduction path of the thermopile 102 is arranged in a substantially annular shape in such a manner to surround a center section of the thin film portion 108. When a uniform magnetic field 114 passes in a direction vertical to a plane through the substantially annular conduction path formed by the thermopile 102, an induced current in a direction of an arrow 115 in FIG. 17 is generated in the thermopile 102 according to the corkscrew rule. Thus, there has been a problem that the thermopile thermal-type infrared sensor is easily influenced by an extraneous electromagnetic noise.

Therefore, there is a need for improving a resistance characteristic of a thermopile thermal-type infrared sensor to an extraneous electromagnetic noise.

SUMMARY OF THE INVENTION

It is an object of the present invention to at least partially solve the problems in the conventional technology.

According to an embodiment, there is provided a thermal-type infrared sensor that includes a thermopile; an electrical conduction path of the thermopile, the conduction path including at least one crossed section in which the conduction path is crossed; a first region that is closed or substantially closed and formed by part of the conduction path, the part of the conduction path including an output section of the conduction path and the at least one crossed section; and a second region that is closed or substantially closed and formed by another part of the conduction path having the at least one crossed section as a boundary. The first region and the second region do not overlap each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
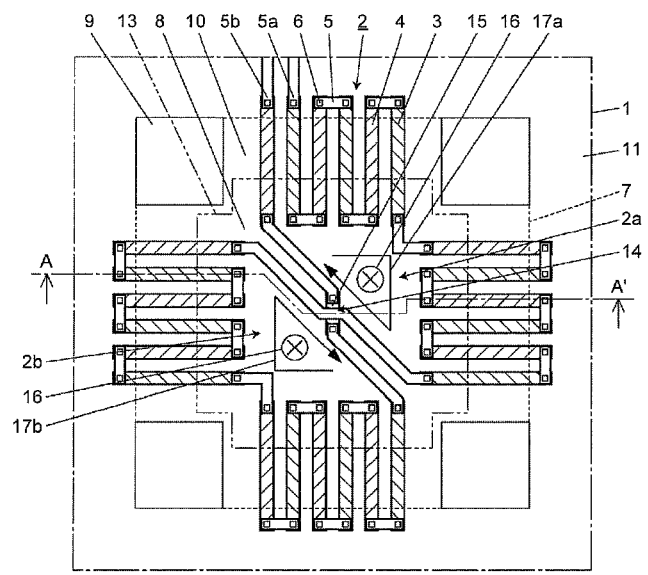
FIG. 1 is a general plane view illustrating a thermal-type infrared sensor according to an embodiment.

In a thermal-type infrared sensor according to the present invention, a closed region formed by a conduction path of a thermopile is a region surrounded and closed by the conduction path when seen from a direction vertical to an arrangement surface of the thermopile. Also, a substantially closed region formed by the conduction path of the thermopile is a region surrounded by the conduction path but not completely closed when seen from the direction vertical to the arrangement surface of the thermopile. For example, output sections (both end section) of the thermopile are usually arranged in such a manner that the output sections do not cross a different section of the conduction path. Thus, a region surrounded by a conduction path section including at least one of the output sections of the thermopile becomes a substantially closed region which is not closed. Note that output sections of the thermopile may cross a different section of the conduction path and a crossed section may be formed. In such a case, a region surrounded by the conduction path of the thermopile does not include a substantially closed region and only includes a closed region.

The thermal-type infrared sensor of the present invention includes, in the conduction path of the thermopile, at least one crossed section in which the conduction path is crossed. Also, a closed or substantially closed first region, which is formed by an output section of the conduction path of the thermopile and the conduction path including the crossed section, and a closed or substantially closed second region, which is formed by the conduction path with the one or more crossed sections as a boundary, are provided. Moreover, the first region and the second region do not overlap each other.

When a uniform magnetic field passes through the conduction path of the thermopile, in a conduction path section surrounding the first region and a conduction path section surrounding the second region, electromagnetic induction is caused in opposite directions and an induced current is canceled in the conduction path of the thermopile. Thus, the thermal-type infrared sensor of the present invention can reduce an induced current in the conduction path of the thermopile and can improve a resistance characteristic to an extraneous electromagnetic noise.

In the thermal-type infrared sensor of the present invention, the following example can be given. That is, when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions.

Also, in the thermal-type infrared sensor of the present invention, an example in which an area inside the first region and an area inside the second region are equal can be given. According to this aspect, values of an induced current to be generated in a conduction path section surrounding the first region and an induced current to be generated in a conduction path section surrounding the second region become substantially the same. Thus, this aspect of the thermal-type infrared sensor of the present invention can substantially eliminate generation of the induced current in the conduction path of the thermopile and can improve a resistance characteristic to an extraneous electromagnetic noise.

In the thermal-type infrared sensor of the present invention, the following example can be given. That is, a plurality of crossed sections and a plurality of second regions are included, wherein when a magnetic field passes through the conduction path of the thermopile, a current in a first direction due to the magnetic field flows in the conduction path of the first region, and the plurality of second regions includes a third region in which a current due to the magnetic field flows in the first direction and a fourth region in which a current due to the magnetic field flows in a second direction which is opposite to the first direction. In this aspect of the thermal-type infrared sensor of the present invention, in a conduction path section surrounding the first region or the third region and a conduction path section surrounding the fourth region, electromagnetic induction in opposite directions is caused and an induced current is canceled in the conduction path of the thermopile. Thus, by this aspect of the thermal-type infrared sensor of the present invention, an induced current in the conduction path of the thermopile can be reduced and a resistance characteristic to an extraneous electromagnetic noise can be improved.

Moreover, an example in which the sum of an area inside the first region and an area inside the third region is equal to an area inside the fourth region can be given. According to this aspect, the sum of an induced current to be generated in a conduction path section surrounding the first region or the third region becomes substantially equal to an induced current to be generated in a conduction path section surrounding the fourth region. Thus, by this aspect of the thermal-type infrared sensor of the present invention, generation of the induced current in the conduction path of the thermopile can be substantially eliminated and a resistance characteristic to an extraneous electromagnetic noise can be improved.

In the thermal-type infrared sensor of the present invention, the following example can be given. That is, a heat insulation structure and an infrared absorption portion are included, wherein the heat insulation structure includes a substrate portion and a thin film portion thinner than the substrate portion, the infrared absorption portion is arranged on the thin film portion of the heat insulation structure, the thermopile is configured by a plurality of first thermopile materials and a plurality of second thermopile materials being connected alternately in series, and the first thermopile materials and the second thermopile materials are arranged over the thin film portion and the substrate portion. In this aspect of the thermal-type infrared sensor of the present invention, sensitivity enough for weak infrared can be acquired by the heat insulation structure.

In the thermal-type infrared sensor of the present invention, an example in which a conduction path section surrounding the first region and a conduction path section surrounding the second region are arranged symmetrically can be given. Here, the conduction path section surrounding the first region and the conduction path section surrounding the second region are preferably arranged symmetrically in such a manner that the an induced current, which is generated in the conduction path of the thermopile when a uniform magnetic field passes through the conduction path of the thermopile, is completely canceled. Thus, by this aspect of the thermal-type infrared sensor of the present invention, the induced current due to the magnetic field can be prevented from being generated in the conduction path of the thermopile and a resistance characteristic to an extraneous electromagnetic noise can be improved.

In the thermal-type infrared sensor of the present invention, an example in which either or both of a first thermopile material and a second thermopile material are a polysilicon material can be given.

A thermopile formed of a polysilicon material has higher electric resistance than a thermopile formed of a metal compound material. Also, in a case of a thermopile, sensitivity of a sensor is improved when the number of thermocouples which configure a thermopile becomes greater, depending on a shape of a heat insulation structure, a shape of a package, or the like. Thus, design to make a line width of a polysilicon material narrow and to increase the number of thermocouples is performed. In such a case, electric resistance of the polysilicon material is increased inversely with the line width.

As described, when a uniform magnetic field passes through a region surrounded by the conduction path of the thermopile, an induced current is generated in the thermopile according to the corkscrew rule. Here, in the thermopile, a noise voltage which is dependent on the product of an induced current and impedance of the thermopile is generated. That is, since having high impedance, the thermopile formed of the polysilicon material is easily influenced by an extraneous electromagnetic noise.

Since being capable of reducing the induced current in the conduction path of the thermopile, the thermal-type infrared sensor of the present invention is particularly effective when either or both of the first thermopile material and the second thermopile material are formed of a polysilicon material.

In the thermal-type infrared sensor of the present invention, the following example can be given. That is, in a region surrounded by the conduction path of the thermopile, a conductive material is arranged in such a manner that an electrical short-circuit is not caused in the conduction path of the thermopile. Since the conductive material is arranged, an area inside the region surrounded by the conduction path of the thermopile virtually becomes smaller than the magnetic field. Thus, by this aspect of the thermal-type infrared sensor of the present invention, an electromagnetic noise can be controlled more effectively and a resistance characteristic to an extraneous electromagnetic noise can be improved.

Moreover, an example in which the conductive material is electrically connected to the thermopile can be given. By this aspect, a potential of the conductive material can be prevented from becoming a floating state.

Moreover, the following example can be given. That is, in a region surrounded by the thermopile, the conductive material is arranged within the maximum range in which an electrical short-circuit is not caused in the conduction path of the thermopile. By this aspect, an electromagnetic noise can be controlled more effectively.

Also, an example in which the conductive material is formed of a material to reflect infrared can be given. In this aspect, an infrared absorption portion can be made thicker equivalently by the conductive material and infrared absorption efficiency can be improved. Thus, sensor sensitivity can be improved.

In the thermal-type infrared sensor of the present invention, the following example can be given. That is, the heat insulation structure includes a plurality of thin film portions and a coupling portion which couples the plurality of thin film portions and is thinner than the substrate portion, the conduction path of the thermopile is formed over the plurality of thin film portions and the coupling portion, and at least one crossed section of the conduction path of the thermopile is arranged on the coupling portion. By this aspect, it also becomes possible, in the thermopile formed over the plurality of thin film portions, to design an arrangement of the conduction path of the thermopile in such a manner that the induced current is completely canceled.

Incidentally, as a package of the thermal-type infrared sensor, a metallic package has been often used conventionally. Since the metallic package blocks an electromagnetic wave, the thermopile of the thermal-type infrared sensor has been rarely influenced directly by an extraneous electromagnetic noise.

Also, recently, miniaturization of the package of the thermal-type infrared sensor has been developed and development of a wafer level package (WLP) which is smaller than the conventional metallic package has been performed.

In the wafer level package, silicon, glass, ceramic, or the like is used as a base material of the package. Thus, compared to the conventional metallic package which blocks the electromagnetic wave, the wafer level package has an inferior electromagnetic shielding characteristic.

When the wafer level package is applied to the package of the thermopile thermal-type infrared sensor, the thermal-type infrared sensor is more likely to pick up an extraneous electromagnetic noise. Specifically, when a polysilicon material having high impedance is used as a thermopile material, an influence of the electromagnetic noise becomes a significant problem.

As described above, the thermal-type infrared sensor of the present invention can reduce, in the conduction path of the thermopile, an induced current due to the magnetic field and can improve a resistance characteristic to the extraneous electromagnetic noise. Thus, even when being applied to the wafer level package, the thermal-type infrared sensor of the present invention can reduce malfunction, a false detection, deterioration of detection sensitivity, and the like due to the extraneous electromagnetic noise.

Next, with reference to the drawings, embodiments of the thermal-type infrared sensor of the present invention will be described. Note that the embodiments described in the following are examples of the present invention. The present invention is not limited to the embodiments described in the following.

Figure 2:
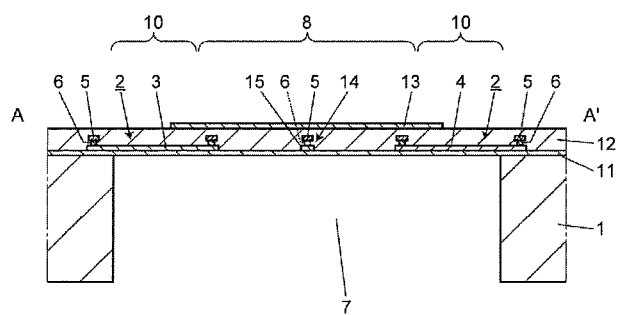
FIG. 2 is a general sectional view of the thermal-type infrared sensor, taken along A-A' line in FIG. 1.

FIG. 1 is a general plane view illustrating a thermal-type infrared sensor according to an embodiment. FIG. 2 is a general sectional view of the thermal-type infrared sensor, taken along A-A' line in FIG. 1.

On a substrate portion 1, a first thermopile material 3 and a second thermopile material 4 which configure a thermopile 2 are connected by a wiring material 5 including a conductive material, whereby a thermocouple is formed. The thermocouples are connected in series in a plurality of stages by the wiring material 5, whereby the thermopile 2 is formed.

The first thermopile material 3 and the second thermopile material 4 are connected, through a contact hole 6, by the wiring material 5 such as aluminum. As a material of the substrate portion 1, a silicon substrate is generally used.

As materials for the first thermopile material 3 and the second thermopile material 4, materials having different polarities in the Seebeck coefficient are used. Generally, an n-type polysilicon material and a p-type polysilicon material are often used. However, the first thermopile material 3 and the second thermopile material 4 are not limited to the n-type polysilicon material and the p-type polysilicon material. For example, the first thermopile material 3 and the second thermopile material 4 may be the n-type polysilicon material and aluminum or the like.

In the thermal-type infrared sensor, a heat insulation structure is formed to detect weak infrared with high sensitivity. In FIG. 1 and FIG. 2, a hollow portion 7 formed on the substrate portion 1 forms a thin film portion 8. The heat insulation structure includes the substrate portion 1 and the thin film portion 8.

The thin film portion 8 is thinner than the substrate portion 1. The heat insulation structure reduces heat conducted from the thin film portion 8 to the substrate portion 1 and improves sensitivity. Also, the heat insulation structure reduces a thermal capacity of the thin film portion 8 and improves responsiveness.

Also, on a thin film section around the thin film portion 8, a plurality of through-holes 9 is formed, whereby a beam portion 10 is formed. The beam portion 10 reduces heat conducted from the thin film portion 8 to the substrate portion 1 and forms a heat insulation structure having higher thermal resistance.

In FIG. 1 and FIG. 2, a configuration in which the thin film portion 8 is supported in a hollow manner by four beam portions 10 is illustrated as an example. The first thermopile material 3 and the second thermopile material 4 are arranged over the thin film portion 8 and the substrate portion 1 across the beam portion 10.

When a silicon substrate is used as the substrate portion 1, the hollow portion 7 can be formed by an etching technique. For example, anisotropic dry etching by inductively coupled plasma (ICP) etching or the like, isotropic etching by $SF_6$, $XeF_2$, or the like, wet etching using crystal anisotropy of silicon, or the like is used. Also, these etching techniques may be combined.

Also, a sectional shape of a side wall of the substrate portion 1 which wall contacts the hollow portion 7 may be a taper shape or a round shape, other than a vertical shape illustrated in FIG. 2. Note that the taper shape or the round shape may be inclined or curved in such a manner that a thin film portion 8 side thereof becomes wider or in such a manner that the thin film portion 8 side thereof becomes narrower. When the taper shape or the round shape is inclined or curved in such a manner that the thin film portion 8 side thereof becomes wider, a bottom portion of the hollow portion 7 may be closed (see, for example, Japanese Laid-open Patent Publication No. 2000-65638).

The first thermopile material 3 and the second thermopile material 4 are formed on an insulation film 11 formed on the substrate portion 1. On the insulation film 11, an interlayer insulation film is formed. The first thermopile material 3 and the second thermopile material 4 are covered by the interlayer insulation film. On the interlayer insulation film, the wiring material 5 is formed. In the interlayer insulation film between the first thermopile material 3 and the second thermopile material 4 and the wiring material 5, a contact hole 6 is formed. On the interlayer insulation film, a different interlayer insulation film is formed to cover the wiring material 5. These interlayer insulation films are illustrated integrally as an interlayer insulation film 12 in FIG. 2. Note that the interlayer insulation film 12 is not illustrated in FIG. 1. On the interlayer insulation film 12, an infrared absorption film 13 is formed.

A MEMS process is generally used to form the heat insulation structure. Thus, as the substrate portion 1, a silicon substrate is often used. In such a case, as the insulation film 11, a silicon oxide film formed by thermal oxidation processing is generally used. Also, as the interlayer insulation film 12, for example, a silicon oxide film formed by a physical vapor deposition (PVD) method or a chemical vapor deposition (CVD) method is generally used. The insulation film 11 and the interlayer insulation film 12 include a function as an infrared absorption layer. As the infrared absorption film 13, for example, a silicon oxide film, a silicon nitride film, an Au-black film, or the like is used.

A junction of the thermopile 2 arranged on the thin film portion 8 insulated from the substrate portion 1 by the hollow portion 7 is a warm junction. A junction of the thermopile 2 formed on the substrate portion 1 including no hollow portion 7 is a cold junction. Also, the infrared absorption film 13 is arranged to cover the warm junction of the thermopile 2.

When infrared is absorbed by an infrared absorption portion including the insulation film 11, the interlayer insulation film 12, and the infrared absorption film 13, a temperature of the thin film portion 8 is increased. Thus, in the thermopile 2, a temperature of the warm junction is increased and a difference between the temperature of the warm junction and that of the cold junction is generated. By the temperature difference, thermo-electromotive force is generated in the thermopile 2. The thermopile thermal-type infrared sensor detects infrared based on the thermo-electromotive force in the thermopile 2.

An electric conduction path of the thermopile 2 includes a crossed section 14 in which two parts of the conduction path cross each other while being insulated from each other. End portions of the conduction path of the thermopile 2 are, for example, output sections 5a and 5b.

The output section 5a is electrically connected, for example, to an end portion of the first thermopile material 3 placed to one end of the thermopile 2 and is formed by a section of the wiring material 5 arranged on the end portion. The output section 5b is electrically connected, for example, to an end portion of the second thermopile material 4 placed to the other end of the thermopile 2 and is formed by a section of the wiring material 5 arranged on the end portion.

However, in the present invention, output sections of the conduction path of the thermopile are not limited to the output sections 5a and 5b. For example, the output sections of the conduction path of the thermopile may be end portions of a thermopile material placed to the end portions of the thermopile or sections of a conductive material which are electrically connected to the end portions and arranged to positions different from the end portions.

A substantially closed first region 2a, which is formed by the output sections 5a and 5b of the conduction path of the thermopile 2 and the conduction path including the crossed section 14, is formed. Also, a closed second region 2b formed by the conduction path of the thermopile 2 with the crossed section 14 as a boundary is formed. The first region 2a and the second region 2b do not overlap each other. The conduction path of the thermopile 2 is arranged substantially in an 8-shape in such a manner that the first region 2a and the second region 2b are surrounded.

The crossed section 14 is arranged on a center portion of the thin film portion 8. The crossed section 14 includes a conductive material for a crossed section 15 and the wiring material 5. The conductive material for a crossed section 15 is formed, for example, of a polysilicon material formed simultaneously with the second thermopile material 4. Note that the conductive material for a crossed section 15 may be a polysilicon material formed simultaneously with the first thermopile material 3.

The first region 2a and the second region 2b are arranged symmetrically. Here, the first region 2a and the second region 2b are arranged symmetrically in such a manner that an induced current is completely canceled, the induced current being generated in the conduction path of the thermopile 2 when a uniform magnetic field 16 passes through the conduction path of the thermopile 2.

Also, an area inside the first region 2a and an area inside the second region 2b are equal. Here, the area inside the first region 2a is an area of when it is assumed that an end portion of the first thermopile material 3 and an end portion of the second thermopile material 4, which are placed to the end portions of the thermopile 2, are connected to each other by the wiring material 5 in similarly to a different thermocouple.

As illustrated in FIG. 1, when the uniform magnetic field 16 passes through the conduction path of the thermopile 2, induced currents according to the corkscrew rule are to be generated in a conduction path section surrounding the first region 2a and in a conduction path section surrounding the second region 2b. In the conduction path section surrounding the first region 2a, the current is to flow in a first direction 17a. In the conduction path section surrounding the second region 2b, the current is to flow in a second direction 17b opposite to the first direction. For example, a direction in which a current flows from the output section 5a to the output section 5b is the first direction 17a. Also, a direction in which a current flows from the output section 5b to the output section 5a is the second direction 17b.

In respect to the induced currents to be generated respectively in the conduction path section surrounding the first region 2a and the conduction path section surrounding the second region 2b, values thereof are substantially the same and directions thereof are opposite in the conduction path of the thermopile 2. When the whole conduction path of the thermopile 2 is considered, the induced currents are almost completely canceled.

Thus, even in the thermopile 2 having high impedance, the induced currents are canceled and become zero, and thus, a noise voltage is not generated and generation of a noise due to an extraneous electromagnetic wave can be controlled.

An advantage of the first region 2a and the second region 2b not overlapping each other will be described.

Figure 3:
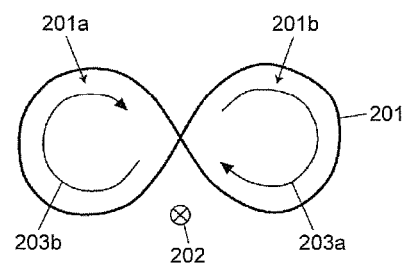
FIG. 3 is a schematic view illustrating a state in which one part of a looped conductive wire is crossed and a first region and a second region which do not overlap each other are formed.
Figure 4:
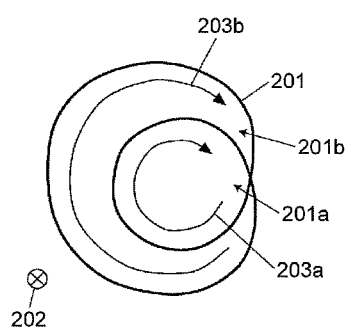
FIG. 4 is a schematic view illustrating a state in which one part of the looped conductive wire is crossed and the first region and the second region are formed in such a manner that the second region surrounds the first region.

FIG. 3 is a schematic view illustrating a state in which one part of a looped conductive wire 201 is crossed and a first region 201a and a second region 201b which do not overlap each other are formed. FIG. 4 is a schematic view illustrating a state in which one portion of the looped conductive wire 201 is crossed and the first region 201a and the second region 201b are formed in such a manner that the second region 201b surrounds the first region 201a.

In FIG. 3, when a uniform magnetic field 202 passes through the first region 201a and the second region 201b, an induced current 203a generated in the first region 201a and an induced current 203b generated in the second region 201b are to flow in directions to cancel each other.

In FIG. 4, the first region 201a overlaps the second region 201b. When the uniform magnetic field 202 passes through the first region 201a and the second region 201b, the induced current 203a generated in the first region 201a and the induced current 203b generated in the second region 201b flow in a direction to be added to each other.

In the embodiment described with reference to FIG. 1 and FIG. 2, the first region 2a and the second region 2b do not overlap each other. Thus, the induced current generated in the conduction path section surrounding the first region 2a and the induced current generated in the conduction path section surrounding the second region 2b cancel each other. In such a manner, since the first region 2a and the second region 2b do not overlap each other, the induced currents which flow in the conduction path of the thermopile 2 due to the magnetic field 16 can be controlled.

In the embodiment described with reference to FIG. 1 and FIG. 2, the crossed section 14 to make the conduction path of the thermopile 2 crossed is necessary. For example, as illustrated in FIG. 1, when the wiring material 5 is used for the crossed section 14, the conductive material for a crossed section 15, which is a layer different from the wiring material 5 which is a normal wiring layer, becomes necessary.

Usually, to reduce a thermal capacity of the thin film portion 8 on which the warm junction of the thermopile 2 is arranged, the thin film portion 8 is desired to be thinner. As the wiring material 5, a first metal wiring layer is used. To prevent the thin film portion 8 from becoming thicker, as the conductive material for a crossed section 15, a conductive material, which is in a layer lower than the wiring material 5, such as polysilicon material wiring is preferably used. Note that in the crossed section 14, a second metal wiring layer or the like which is in a layer upper than the wiring material 5 may be used.

In the embodiment illustrated in FIG. 1 and FIG. 2, an example in which the polysilicon material wiring is used as the conductive material for a crossed section 15 is illustrated. The wiring material 5 and the conductive material for a crossed section 15 are connected through the contact hole 6 similarly to a different conduction path section in the thermopile 2. When a polysilicon material is used as the first thermopile material 3 and the second thermopile material 4, the thermopile material and the conductive material for a crossed section 15 can be commonalized and a process can be simplified.

As described above, in this embodiment, the conduction path of the thermopile 2 includes the conduction path section surrounding the substantially closed first region 2a and the conduction path section surrounding the closed second region 2b. Moreover, when the uniform magnetic field 16 passes through the first region 2a and the second region 2b, the sum of the induced currents generated in the conduction path of the thermopile 2 becomes substantially zero. Thus, the thermal-type infrared sensor of this embodiment can control generation of a noise due to an extraneous electromagnetic wave in the thermopile 2.

Figure 5:
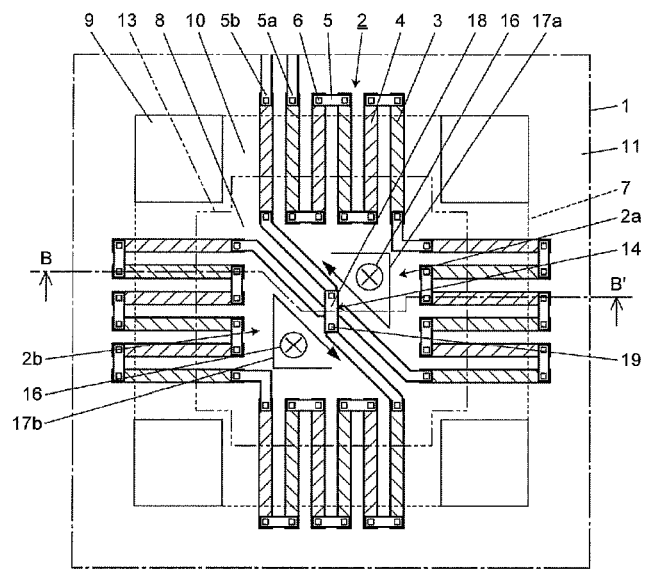
FIG. 5 is a general plane view illustrating a thermal-type infrared sensor according to another embodiment.
Figure 6:
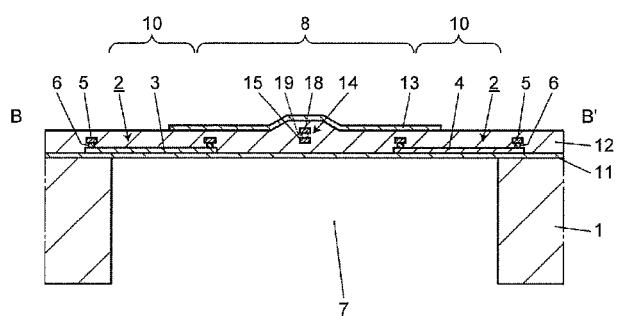
FIG. 6 is a general sectional view of the thermal-type infrared sensor according to another embodiment, taken along B-B' line in FIG. 5.

FIG. 5 is a general plane view illustrating a thermal-type infrared sensor according to another embodiment. FIG. 6 is a general sectional view for describing the embodiment. FIG. 6 is a general sectional view of the thermal-type infrared sensor, taken along B-B' line in FIG. 5. In FIG. 5 and FIG. 6, the same reference sign is assigned to a section having the same function with that of FIG. 1 and FIG. 2.

This embodiment includes a configuration in which a second metal wiring layer is used as a conductive material for a crossed section 18 in a crossed section 14 of a conduction path of a thermopile 2. The conductive material for a crossed section 18 and a wiring material 5 are electrically connected through a through-hole 19.

Also, by adding an etching process to make a thin film portion 8 not in a peripheral portion of the conductive material for a crossed section 18 thinner, it is possible to reduce an increase in a thermal capacity of the thin film portion 8.

In this embodiment, a description of a first thermopile material 3 or a second thermopile material 4 of the thermopile 2, a wiring material 5, a method to arrange a conduction path of the thermopile 2, and the like is similar to that of the embodiment described with reference to FIG. 1 and FIG. 2 and is omitted here.

Figure 7:
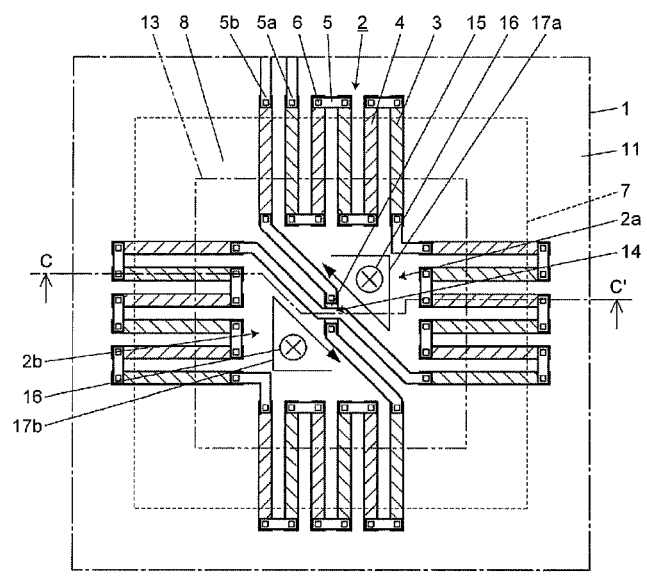
FIG. 7 is a general plane view illustrating a thermal-type infrared sensor according to still another embodiment.
Figure 8:
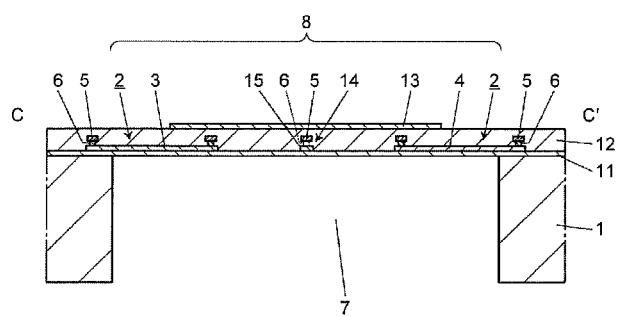
FIG. 8 is a general sectional view of the thermal-type infrared sensor according to still another embodiment, taken along C-C' line in FIG. 7.

FIG. 7 is a general plane view illustrating a thermal-type infrared sensor according to still another embodiment. FIG. 8 is a general sectional view of the thermal-type infrared sensor, taken along C-C' line in FIG. 7. In FIG. 7 and FIG. 8, the same reference sign is assigned to a section having the same function with that of FIG. 1 and FIG. 2.

In this embodiment, a heat insulation structure does not include a beam portion and a thin film portion 8 has a diaphragm shape. In this embodiment, since there is no beam portion, possibility for destruction of the heat insulation structure is reduced. Moreover, in this embodiment, a process to open a through-hole is not necessary, and thus, a manufacturing process can be simplified.

In this embodiment, a description of a first thermopile material 3 or a second thermopile material 4 of a thermopile 2, a wiring material 5, a method to arrange a conduction path of the thermopile 2, or the like is similar to that of the embodiment described with reference to FIG. 1 and FIG. 2 and is omitted here.

Figure 9:
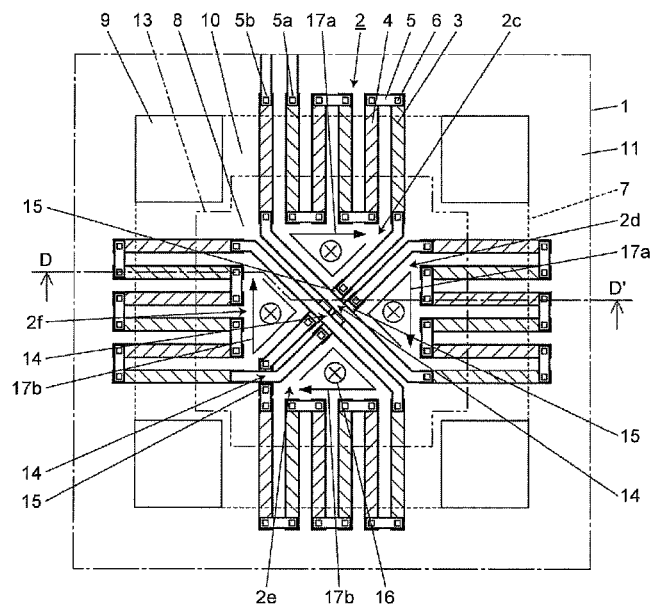
FIG. 9 is a general plane view illustrating a thermal-type infrared sensor according to still another embodiment.
Figure 10:
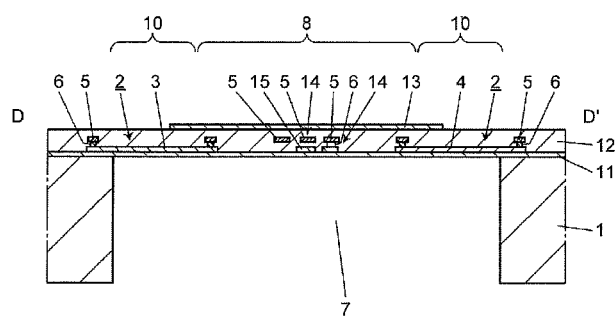
FIG. 10 is a general sectional view of the thermal-type infrared sensor according to still another embodiment, taken along D-D' line in FIG. 9.

FIG. 9 is a general plane view illustrating a thermal-type infrared sensor according to still another embodiment. FIG. 10 is a general sectional view of the thermal-type infrared sensor, taken along D-D' line in FIG. 9. In FIG. 9 and FIG. 10, the same reference sign is assigned to a section having the same function with that of FIG. 1 and FIG. 2.

In the above described embodiments, one crossed section 14 is formed on the thermopile 2 and the first region 2a and the second region 2b are formed. On the other hand, in this embodiment, three crossed sections 14 are formed and a first region 2c, a third region 2d, and fourth regions 2e and 2f are formed. The first region 2c, the third region 2d, and the fourth regions 2e and 2f are arranged in a substantially symmetrical manner to a center of a thin film portion 8.

The first region 2c is formed by a substantially closed region formed by output sections 5a and 5b of a conduction path of a thermopile 2 and the conduction path including a crossed section 14. Each of the third region 2d and the fourth regions 2e and 2f is formed by a closed region formed by the conduction path of the thermopile 2 with a crossed section 14 as a boundary. The first region 2c, the third region 2d, and the fourth regions 2e and 2f do not overlap each other.

Also, the sum of an area inside the first region 2c and an area inside the third region 2d is equal to the sum of an area inside the fourth region 2e and an area inside the fourth region 2f. Here, the area inside the first region 2c is an area of when it is assumed that an end portion of a first thermopile material 3 and an end portion of a second thermopile material 4, which are placed to end portions of the thermopile 2, are connected to each other by a wiring material 5 in similarly to a different thermocouple.

When a uniform magnetic field 16 passes through the conduction path of the thermopile 2, induced currents are to be generated in a first direction 17a respectively in the first region 2c and the third region 2d. Also, in the fourth regions 2e and 2f, induced currents are to be generated respectively in a second direction 17b.

Values of the induced currents to be generated respectively in the first region 2c, third region 2d and the fourth regions 2e and 2f are substantially the same. Also, the induced currents to be generated in the first region 2c and the third region 2d and the induced currents to be generated in the fourth regions 2e and 2f are in opposite directions in the conduction path of the thermopile 2. Thus, when the whole conduction path of the thermopile 2 is considered, the induced currents are almost completely canceled.

In this embodiment, a description of the first thermopile material 3 or the second thermopile material 4 of the thermopile 2, a wiring material 5, a method to arrange the conduction path of the thermopile 2, and the like is similar to that of the embodiment described with reference to FIG. 1 and FIG. 2 and is omitted here.

In the present invention, the thermopile is preferably configured in such a manner that the sum of the induced currents generated in the thermopile becomes substantially zero. More preferably, when the number of regions surrounded by the conduction path of the thermopile is even and shapes thereof are substantially the same, the sum of the induced currents generated in the conduction path of the thermopile becomes substantially zero, spontaneously.

Note that in the present invention, the number of regions surrounded by the conduction path of the thermopile is not limited. Also, in the present invention, shapes of the regions surrounded by the conduction path of the thermopile are not limited to be the same.

Figure 11:
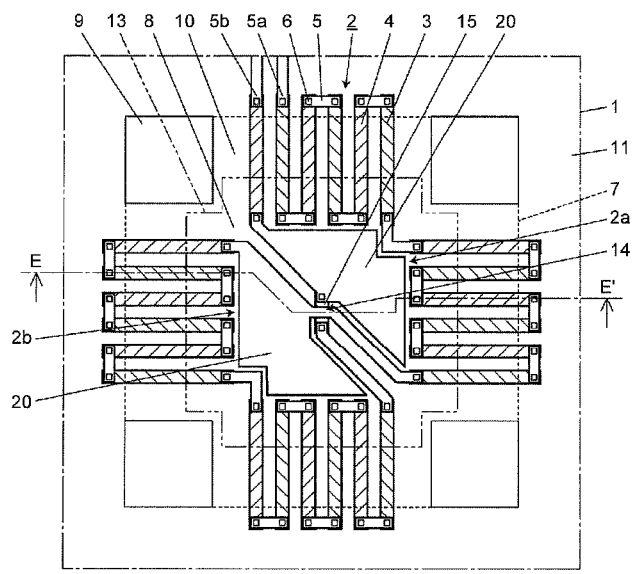
FIG. 11 is a general plane view illustrating a thermal-type infrared sensor according to still another embodiment.
Figure 12:
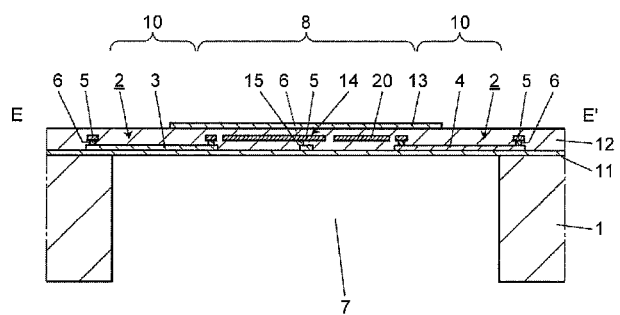
FIG. 12 is a general sectional view of the thermal-type infrared sensor according to still another embodiment, taken along E-E' line in FIG. 11.

FIG. 11 is a general plane view illustrating a thermal-type infrared sensor according to still another embodiment. FIG. 12 is a general sectional view of the thermal-type infrared sensor, taken along E-E' line in FIG. 11. In FIG. 11 and FIG. 12, the same reference sign is assigned to a section having the same function with that of FIG. 1 and FIG. 2.

In this embodiment, in a region surrounded by a conduction path of a thermopile 2, a conductive material 20 is arranged in such a manner that an electrical short-circuit is not caused in the conduction path of the thermopile 2. The conductive material 20 is formed simultaneously with a wiring material 5, the two being formed of the same material.

The conductive material 20 is electrically connected to the wiring material 5 in such a manner that an electrical short-circuit is not caused in the conduction path of the thermopile 2. Also, in the region surrounded by the conduction path of the thermopile 2, the conductive material 20 is arranged within the maximum range in which an electrical short-circuit is not caused in the conduction path of the thermopile 2.

Since the conductive material 20 is arranged, areas inside a first region 2a and a second region 2b formed by the conduction path of the thermopile 2 virtually become smaller than the magnetic field. Thus, in this embodiment, it is possible to control an electromagnetic noise more effectively.

Also, when being formed by a first metal wiring layer similarly to the wiring material 5, the conductive material 20 can also function as a reflection film of infrared. For example, in the sectional view illustrated in FIG. 12, when infrared enters a thin film portion 8 from a side of a substrate portion 1, the first metal wiring layer is placed in a relatively upper layer of the thin film portion 8. Thus, when infrared is reflected by the conductive material 20, an infrared absorption layer in the thin film portion 8 becomes thicker equivalently and infrared absorption efficiency can be improved. Note that the conductive material 20 may be formed of a material to absorb or transmit the infrared.

Also, the conductive material 20 is integrally formed with the wiring material 5 and prevented from becoming an electrically floating state. Note that the conductive material 20 and the conduction path of the thermopile 2 may be electrically insulated.

In such a manner, in this embodiment, in addition to the effect of the above described embodiment, an effect to control an electromagnetic noise can be further improved and infrared absorption efficiency can be improved.

In this embodiment, a description of a first thermopile material 3 or a second thermopile material 4 of the thermopile 2, the wiring material 5, a method to arrange the conduction path of the thermopile 2, and the like is similar to that of the embodiment described with reference to FIG. 1 and FIG. 2 and is omitted here. Note that in this embodiment, an infrared absorption film 13 may not be arranged.

Figure 13:
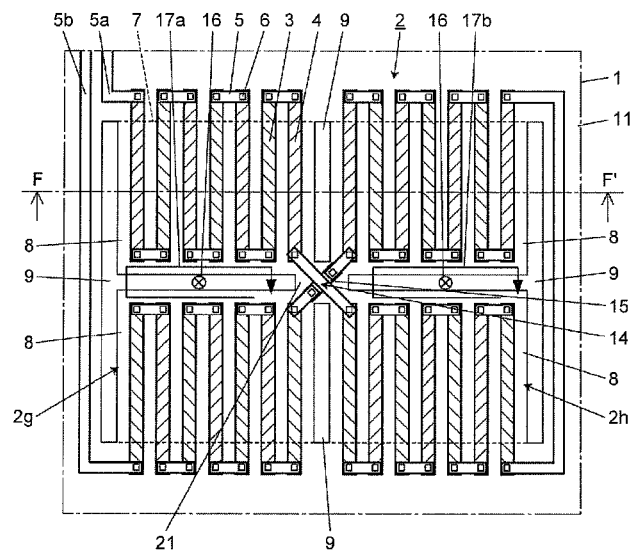
FIG. 13 is a general plane view illustrating a thermal-type infrared sensor according to still another embodiment.
Figure 14:
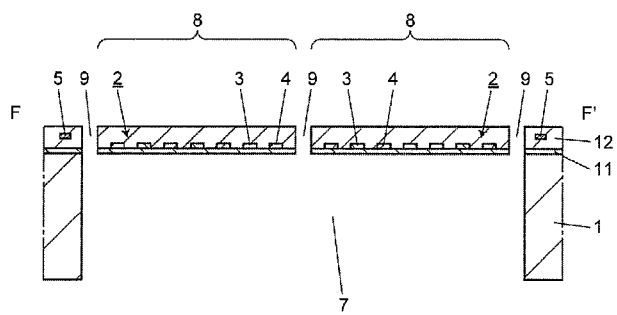
FIG. 14 is a general sectional view of the thermal-type infrared sensor according to still another embodiment, taken along F-F' line in FIG. 13.

FIG. 13 is a general plane view illustrating a thermal-type infrared sensor according to still another embodiment. FIG. 14 is a general sectional view of the thermal-type infrared sensor, taken along F-F' line in FIG. 13. In FIG. 13 and FIG. 14, the same reference sign is assigned to a section having the same function with that of FIG. 1 and FIG. 2.

A heat insulation structure of this embodiment includes a plurality of thin film portions 8 and a coupling portion 21 to couple the plurality of thin film portions 8. The coupling portion 21 is thinner than a substrate portion 1. A layer configuration of the coupling portion 21 is, for example, the same with that of the thin film portions 8.

A conduction path of a thermopile 2 is formed over the plurality of thin film portions 8 and the coupling portion 21. A crossed section 14 of the conduction path of the thermopile 2 is arranged on the coupling portion 21. By the conduction path of the thermopile 2, a substantially closed first region 2g and a closed second region 2h are formed. The first region 2g and the second region 2h are arranged almost symmetrically to the crossed section 14.

The first region 2g is formed by a substantially closed region formed by output sections 5a and 5b of the conduction path of the thermopile 2 and the conduction path including the crossed section 14. Also, the second region 2h is formed by a closed region formed by the conduction path of the thermopile 2 with the crossed section 14 as a boundary.

The first region 2g and the second region 2h do not overlap each other. Also, an area inside the first region 2g and an area inside the second region 2h are equal.

When a uniform magnetic field 16 passes through the conduction path of the thermopile 2, in a conduction path section surrounding the first region 2g and a conduction path section surrounding the second region 2h, induced currents having the same value and in opposite directions are to be generated. Thus, in a whole conduction path of the thermopile 2, the induced currents are canceled and become substantially zero. Thus, also in this embodiment, similarly to the above embodiments, a resistance characteristic to an electromagnetic noise can be improved.

In this embodiment, a description of a first thermopile material 3 or a second thermopile material 4 of the thermopile 2, a wiring material 5, a method to arrange the conduction path of the thermopile 2, and the like is similar to that of the embodiment described with reference to FIG. 1 and FIG. 2 and is omitted here.

Note that in this embodiment, similarly to the embodiment described with reference to FIG. 1 and FIG. 2, an infrared absorption film 13 may be provided on an interlayer insulation film 12 in the thin film portion 8.

Figure 15:
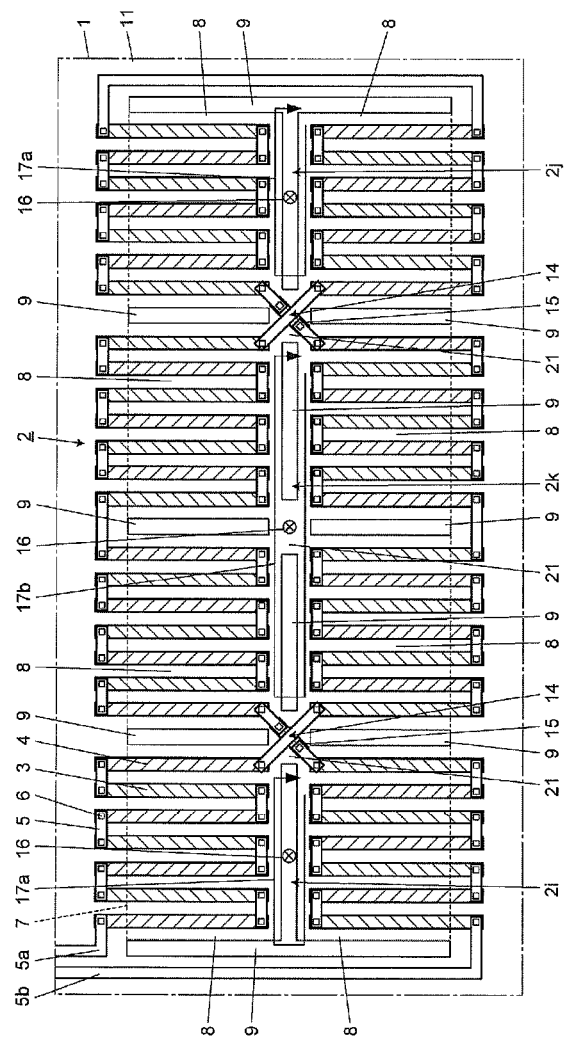
FIG. 15 is a general plane view illustrating a thermal-type infrared sensor according to still another embodiment.

FIG. 15 is a general plane view illustrating a thermal-type infrared sensor according to still another embodiment. In FIG. 15, the same reference sign is assigned to a section having the same function with that of FIG. 1, FIG. 2, FIG. 13, and FIG. 14.

A heat insulation structure of this embodiment includes a plurality of thin film portions 8 and a plurality of coupling portions 21 to couple the plurality of thin film portions 8. Here, eight thin film portions 8 and three coupling portions 21 are provided.

A conduction path of a thermopile 2 is formed over the eight thin film portions 8 and the two coupling portions 21. In the conduction path of the thermopile 2, two crossed sections 14 are provided. The two crossed sections 14 are respectively arranged on the coupling portions 21.

By the conduction path of the thermopile 2, a substantially closed first region 2i, a closed third region 2j, and a closed fourth region 2k are formed. The first region 2i is formed by a substantially closed region formed by output sections 5a and 5b of the conduction path of the thermopile 2 and the conduction path including the crossed section 14. The third region 2j is formed by a closed region formed by the conduction path of the thermopile 2 with one crossed section 14 as a boundary. The fourth region 2k is formed by a closed region formed by the conduction path of the thermopile 2 with two crossed sections 14 as a boundary.

The first region 2i, the third region 2j, and the fourth region 2k do not overlap each other. Also, the sum of an area inside the first region 2i and an area inside the third region 2j is equal to an area inside the fourth region 2k.

When a uniform magnetic field 16 passes through the conduction path of the thermopile 2, in the conduction path surrounding the first region 2i and the conduction path surrounding the third region 2j, induced currents having the same value and in a first direction 17a are to be generated. Also, in the conduction path surrounding the fourth region 2k, an induced current is to be generated in a second direction 17b opposite to the first direction 17a. Here, a value of the induced current is proportional to an area inside a region surrounded by a conduction path in which a magnetic flux passes through.

When the conduction path of the thermopile 2 is arranged in such a manner that the sum of the area inside the first region 2i and the area inside the third region 2j becomes equal to the area inside the fourth region 2k, the induced currents are canceled and become substantially zero in a whole conduction path of the thermopile 2. Thus, also in this embodiment, similarly to the above embodiments, a resistance characteristic to an electromagnetic noise can be improved.

In such a manner, in the thermal-type infrared sensor of the present invention, three or more closed or substantially closed regions may be formed in the conduction path of the thermopile. In such a case, the conduction path of the thermopile is arranged in such a manner that the sum of areas of closed or substantially closed regions in which induced currents are generated in a certain direction (first direction) becomes equal to the sum of areas of closed or substantially closed regions in which induced currents are generated in the opposite direction (second direction).

In this embodiment, a description of a first thermopile material 3 or a second thermopile material 4 of the thermopile 2, a wiring material 5, a method to arrange the conduction path of the thermopile 2, and the like is similar to that of the embodiment described with reference to FIG. 1 and FIG. 2 and is omitted here.

Note that in this embodiment, similarly to the embodiment described with reference to FIG. 1 and FIG. 2, an infrared absorption film 13 may be provided on an interlayer insulation film 12 in the thin film portion 8.

In the above, embodiments of the present invention have been described. However, a numerical value, a material, an arrangement, a number, and the like are examples and the present invention is not limited thereto. Various modifications can be made within the scope of the present invention described in claims.

For example, in the above embodiments, a thermal-type infrared sensor includes a thermopile, an infrared absorption portion, and a heat insulation structure, but a thermal-type infrared sensor to which the present invention is applied is not limited thereto. The present invention can be applied to a thermal-type infrared sensor of any configuration as long as the thermal-type infrared sensor includes a thermopile.

The thermal-type infrared sensor according to any one of the embodiments described above may be included in an image forming apparatus such as a copier, a printer, a facsimile, a scanner, and a multifunction peripheral.

Figure 16:
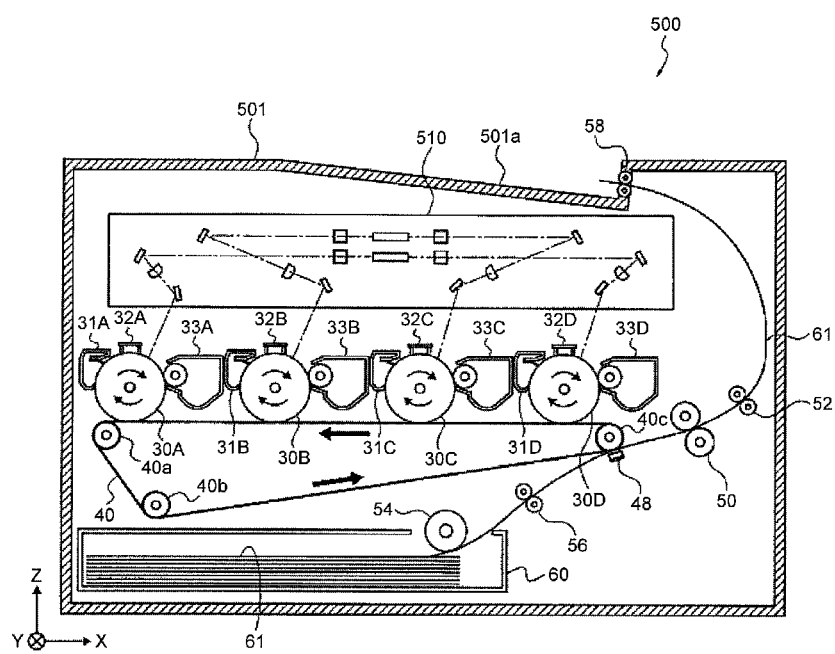
FIG. 16 illustrates an image forming apparatus including the thermal-type infrared sensor according to any one of the embodiments.
Figure 17:
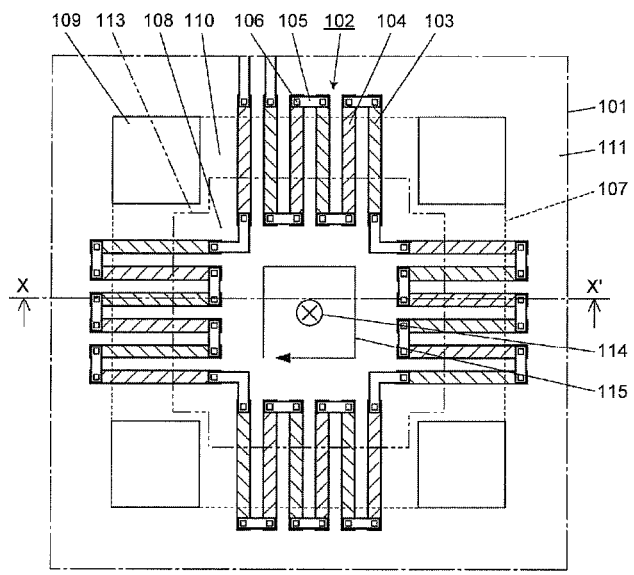
FIG. 17 is a general plane view for describing a conventional thermal-type infrared sensor.
Figure 18:
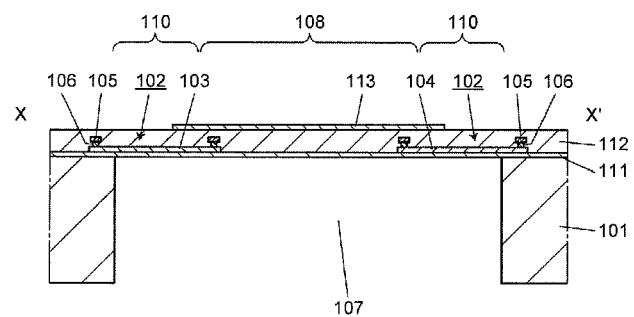
FIG. 18 is a general sectional view for describing the conventional technique and corresponding to an X-X' position in FIG. 17.

FIG. 16 illustrates an image forming apparatus including the thermal-type infrared sensor according to any one of the embodiments.

The image forming apparatus 500 illustrated in FIG. 16 is, for example, a tandem type color printer which prints multi-color images by superimposing and transferring black, yellow, magenta, and cyan color toner images onto sheets of paper. The image-forming apparatus 500 as illustrated in FIG. 16 includes an optical scan apparatus 510, four photoconductive drums 30A to 30D, a transfer belt 40, a paper feed tray 60, a paper feed roller 54, a first resist roller 56, a second resist roller 52, a fuse roller 50, a paper discharge roller 58, a not-shown controller collectively controlling the respective components, and a housing 501 in a rectangular solid shape accommodating the components. In FIG. 16, the thermal-type infrared sensor is not illustrated but included as a variety of temperature sensors such as a motion sensor in the image forming apparatus 500.

A paper discharge tray 501a on which printed sheets are discharged is formed on the top surface of the housing 501. The optical scan apparatus 510 is disposed under the paper discharge tray 501a.

The optical scan apparatus 510 scans the photoconductive drum 30A with a light beam for black image components modulated by image information supplied from a higher-level device (such as personal computer). Similarly, it scans the photoconductive drum 30B with a light beam for cyan image components, the photoconductive drum 30C with a light beam for magenta image components, and the photoconductive drum 30D with a light beam for yellow image components.

The four photoconductive drums 30A to 30D are cylindrical members and have photoconductive layers on their surfaces which become electrically conductive when illuminated with a light beam. They are disposed with an equal interval in an X-axis direction under the optical scan apparatus 510 in FIG. 16.

The photoconductive drum 30A is disposed at an end portion of a reverse X-axis direction (left side in FIG. 16) inside the housing 501 so that its longitudinal direction is to be the Y-axis direction. The photoconductive drum 30A is rotated by a not-shown rotation mechanism clockwise (as indicated by black arrows in FIG. 16). An electric charger 32A at the 12 o'clock position (upper side), a toner cartridge 33A at 2 o'clock position and a cleaning case 31A at the 10 o'clock position are disposed around the photoconductive drum 30A.

The electric charger 32A is disposed with a predetermined clearance over the surface of the photoconductive drum 30A with its longitudinal direction as the Y-axis direction. It electrically charges the surface of the photoconductive drum 30A with a predetermined voltage.

The toner cartridge 33A includes a cartridge body containing a toner of black image components and a developing roller charged with a voltage of reverse polarity of that of the photoconductive drum 30A, and the like. The toner cartridge 33A supplies the toner in the cartridge body to the surface of the photoconductive drum 30A via the developing roller.

The cleaning case 31A is provided with a cleaning blade of a rectangular shape with its longitudinal direction as the Y-axis direction, and it is disposed so that one end of the cleaning blade comes in contact with the surface of the photoconductive drum 30A. The toner adhering on the surface of the photoconductive drum 30A is removed by the cleaning blade along with the rotation of the photoconductive drum 30A and collected in the cleaning case 31A.

The photoconductive drums 30B, 30C, 30D with the same structure as that of the photoconductive drum 30A are placed in sequence on the right side of the photoconductive drum 30A with a predetermined interval. They are rotated by a not-shown rotation mechanism clockwise (as indicated by the black arrows in FIG. 16). Similarly to the photoconductive drum 30A, electric chargers 32B, 32C, 32D, toner cartridges 33B, 33C, 33D, and cleaning cases 31B, 31C, 31D are disposed around the photoconductive drums 30B, 30C, 30D, respectively.

The electric chargers 32B, 32C, 32D with the same structure as that of the electric charger 32A are disposed to electrically charge the surfaces of the photoconductive drums 30B, 30C, 30D with a predetermined voltage, respectively.

The toner cartridges 33B, 33C, 33D include cartridge bodies containing toners of cyan, magenta, yellow image components and developing rollers charged with a voltage of reverse polarity of that of the photoconductive drums 30B, 30C, 30D, and the like, respectively. The toner cartridges 33B, 33C, 33D supply the toners in the cartridge bodies to the surfaces of the photoconductive drums 30B, 30C, 30D via the developing rollers, respectively.

The structure and function of the cleaning cases 31B, 31C, 31D are the same as those of the cleaning case 31A.

Hereinafter, a unit of the photoconductive drum 30A, the electric charger 32A, the toner cartridge 33A, and the cleaning case 31A is to be referred to as the first image-forming station; likewise, a unit of the photoconductive drum 30B, the electric charger 32B, the toner cartridge 33B, and the cleaning case 31B as the second image-forming station, a unit of the photoconductive drum 30C, the electric charger 32C, the toner cartridge 33C, and the cleaning case 31C as the third image-forming station, and a unit of the photoconductive drum 30D, the electric charger 32D, the toner cartridge 33D, and the cleaning case 31D as the fourth image-forming station.

The transfer belt 40 is a free end ring-like member and rolls over driven rollers 40a, 40c placed under the photoconductive drums 30A, 30D, respectively, and rolls over a drive roller 40b which is placed at a slightly lower position than the driven rollers 40a, 40c. The upper end surface of the transfer belt 40 is in contact with the lower end surfaces of the photoconductive drums 30A, 30B, 30C, 30D. The transfer belt 40 is rotated counterclockwise (as indicated by the black arrows in FIG. 16) by counterclockwise rotation of the drive roller 40b. A transfer charger (transfer unit) 48 is applied with a voltage of a reverse polarity of that of the electric chargers 32A, 32B, 32C, 32D and is placed close to one end of the transfer belt 40 in the X-axis direction (right side in FIG. 16).

The paper feed tray 60 of a substantially rectangular solid shape is placed under the transfer belt 40 and contains stacked-up paper sheets 61 for printing. The paper feed tray 60 has a feeder outlet of a rectangular shape close to one end of the upper surface thereof in the X-axis direction (right side in FIG. 16).

The paper feed roller 54 extracts paper sheets 61 one by one from the paper feed tray 60 to feed them to a gap formed between the transfer belt 40 and the transfer charger 48 via the first resist roller 56 composed of a pair of rotary rollers.

The fuse roller 50 is composed of a pair of rotary rollers, and applies heat and pressure to the paper sheets 61 to feed the paper sheets 61 to the discharge roller 58 via the resist roller 52 composed of a pair of rotary rollers. The discharge roller 58 is composed of a pair of rotary rollers and discharges the paper sheets 61 to the discharge tray 501a.

According to the embodiments, the thermal-type infrared sensor can improve a resistance characteristic to an extraneous electromagnetic noise.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A thermal-type infrared sensor comprising:
   a thermopile;
   an electrical conduction path of the thermopile, the conduction path including at least one crossed section in which the conduction path is crossed;
   a first region that is closed or substantially closed and formed by part of the conduction path, the part of the conduction path including an output section of the conduction path and the at least one crossed section; and
   a second region that is closed or substantially closed and formed by another part of the conduction path having the at least one crossed section as a boundary,
   wherein the first region and the second region do not overlap each other.

2. The thermal-type infrared sensor according to claim 1, wherein when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions.

3. The thermal-type infrared sensor according to claim 1, wherein an area inside the first region and an area inside the second region are equal.

4. The thermal-type infrared sensor according to claim 1, wherein
   the conduction path includes a plurality of crossed sections in which the conduction path is crossed, and
   when a magnetic field passes through the conduction path of the thermopile, a current in a first direction due to the magnetic field flows in the conduction path of the first region, and
   the second region includes a third region in which a current due to the magnetic field flows in the first direction and a fourth region in which a current due to the magnetic field flows in a second direction which is opposite to the first direction.

5. The thermal-type infrared sensor according to claim 4, wherein the sum of an area inside the first region and an area inside the third region is equal to an area inside the fourth region.

6. The thermal-type infrared sensor according to claim 1, further comprising a heat insulation structure and an infrared absorption portion,
   wherein the heat insulation structure includes a substrate portion and a thin film portion thinner than the substrate portion,
   the infrared absorption portion is arranged on the thin film portion of the heat insulation structure,
   the thermopile includes a plurality of first thermopile materials and a plurality of second thermopile materials so that the first thermopile materials and the second thermopile materials are connected alternately in series, and
   the first thermopile materials and the second thermopile materials are arranged over the thin film portion and the substrate portion.

7. The thermal-type infrared sensor according to claim 6, wherein either or both of the first thermopile materials and the second thermopile materials are a polysilicon material.

8. The thermal-type infrared sensor according to claim 1, wherein in a region surrounded by the conduction path of the thermopile, a conductive material is arranged in a manner that an electrical short-circuit is not caused in the conduction path of the thermopile.

9. The thermal-type infrared sensor according to claim 8, wherein the conductive material is electrically connected to the thermopile.

10. The thermal-type infrared sensor according to claim 8, wherein the conductive material is formed of a material to reflect infrared.

11. The thermal-type infrared sensor according to claim 1, wherein
    when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions, and
    an area inside the first region and an area inside the second region are equal.

12. The thermal-type infrared sensor according to claim 1, further comprising a heat insulation structure and an infrared absorption portion, wherein
  the heat insulation structure includes a substrate portion and a thin film portion thinner than the substrate portion,
  the infrared absorption portion is arranged on the thin film portion of the heat insulation structure,
  the thermopile includes a plurality of first thermopile materials and a plurality of second thermopile materials so that the first thermopile materials and the second thermopile materials are connected alternately in series,
  the first thermopile materials and the second thermopile materials are arranged over the thin film portion and the substrate portion, and
  when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions.

13. The thermal-type infrared sensor according to claim 1, further comprising a heat insulation structure and an infrared absorption portion, wherein
  the heat insulation structure includes a substrate portion and a thin film portion thinner than the substrate portion,
  the infrared absorption portion is arranged on the thin film portion of the heat insulation structure,
  the thermopile includes a plurality of first thermopile materials and a plurality of second thermopile materials so that the first thermopile materials and the second thermopile materials are connected alternately in series,
  the first thermopile materials and the second thermopile materials are arranged over the thin film portion and the substrate portion, and
  an area inside the first region and an area inside the second region are equal.

14. The thermal-type infrared sensor according to claim 1, further comprising a heat insulation structure and an infrared absorption portion, wherein
  the heat insulation structure includes a substrate portion and a thin film portion thinner than the substrate portion,
  the infrared absorption portion is arranged on the thin film portion of the heat insulation structure,
  the thermopile includes a plurality of first thermopile materials and a plurality of second thermopile materials so that the first thermopile materials and the second thermopile materials are connected alternately in series,
  the first thermopile materials and the second thermopile materials are arranged over the thin film portion and the substrate portion,
  the conduction path includes a plurality of crossed sections in which the conduction path is crossed, and
  when a magnetic field passes through the conduction path of the thermopile, a current in a first direction due to the magnetic field flows in the conduction path of the first region, and
  the second region includes a third region in which a current due to the magnetic field flows in the first direction and a fourth region in which a current due to the magnetic field flows in a second direction which is opposite to the first direction.

15. The thermal-type infrared sensor according to claim 1, further comprising a heat insulation structure and an infrared absorption portion, wherein
  the heat insulation structure includes a substrate portion and a thin film portion thinner than the substrate portion,
  the infrared absorption portion is arranged on the thin film portion of the heat insulation structure,
  the thermopile includes a plurality of first thermopile materials and a plurality of second thermopile materials so that the first thermopile materials and the second thermopile materials are connected alternately in series,
  the first thermopile materials and the second thermopile materials are arranged over the thin film portion and the substrate portion,
  the conduction path includes a plurality of crossed sections in which the conduction path is crossed, and
  when a magnetic field passes through the conduction path of the thermopile, a current in a first direction due to the magnetic field flows in the conduction path of the first region,
  the second region includes a third region in which a current due to the magnetic field flows in the first direction and a fourth region in which a current due to the magnetic field flows in a second direction which is opposite to the first direction, and
  the sum of an area inside the first region and an area inside the third region is equal to an area inside the fourth region.

16. The thermal-type infrared sensor according to claim 1, further comprising a heat insulation structure and an infrared absorption portion, wherein
  the heat insulation structure includes a substrate portion and a thin film portion thinner than the substrate portion,
  the infrared absorption portion is arranged on the thin film portion of the heat insulation structure,
  the thermopile includes a plurality of first thermopile materials and a plurality of second thermopile materials so that the first thermopile materials and the second thermopile materials are connected alternately in series,
  the first thermopile materials and the second thermopile materials are arranged over the thin film portion and the substrate portion,
  when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions, and
  an area inside the first region and an area inside the second region are equal.

17. The thermal-type infrared sensor according to claim 1, wherein
  when a magnetic field passes through the conduction path of the thermopile, a current in a first direction due to the magnetic field flows in the conduction path of the first region and a current in a second direction due to the magnetic field flows in the conduction path of the second region, the first direction and the second direction being opposite directions, and
  in a region surrounded by the conduction path of the thermopile, a conductive material is arranged in a manner that an electrical short-circuit is not caused in the conduction path of the thermopile.

18. The thermal-type infrared sensor according to claim 1, wherein
- the conduction path includes a plurality of crossed sections in which the conduction path is crossed, and
- when a magnetic field passes through the conduction path of the thermopile, a current in a first direction due to the magnetic field flows in the conduction path of the first region,
- the second region includes a third region in which a current due to the magnetic field flows in the first direction and a fourth region in which a current due to the magnetic field flows in a second direction which is opposite to the first direction, and
- in a region surrounded by the conduction path of the thermopile, a conductive material is arranged in a manner that an electrical short-circuit is not caused in the conduction path of the thermopile.

19. The thermal-type infrared sensor according to claim 1, further comprising a heat insulation structure and an infrared absorption portion, wherein
- the heat insulation structure includes a substrate portion and a thin film portion thinner than the substrate portion,
- the infrared absorption portion is arranged on the thin film portion of the heat insulation structure,
- the thermopile includes a plurality of first thermopile materials and a plurality of second thermopile materials so that the first thermopile materials and the second thermopile materials are connected alternately in series,
- the first thermopile materials and the second thermopile materials are arranged over the thin film portion and the substrate portion, and
- in a region surrounded by the conduction path of the thermopile, a conductive material is arranged in a manner that an electrical short-circuit is not caused in the conduction path of the thermopile.

20. An image forming apparatus comprising the thermal-type infrared sensor according to claim 1.

21. The thermal-type infrared sensor according to claim 1, wherein a same current flows throughout the part of the conduction path that forms the closed or substantially closed first region, and a same current flows throughout said another part of the conduction path that forms the closed or substantially closed second region.

* * * * *